United States Patent [19]
Estorff

[11] 4,022,449
[45] May 10, 1977

[54] LEAF SPRING

[75] Inventor: Eckart v. Estorff, Werdohl, Germany

[73] Assignee: Stahlwerke Bruninghaus GmbH, Werdohl, Westfalen, Germany

[22] Filed: Apr. 26, 1974

[21] Appl. No.: 464,623

[30] Foreign Application Priority Data

Apr. 26, 1973 Germany .......................... 2321190

[52] U.S. Cl. .................................... 267/48; 267/53; 29/172
[51] Int. Cl.² .......................................... F16F 1/18
[58] Field of Search ............ 267/47, 54 R, 53, 9 R, 267/9 B, 9 A, 51, 48; 214/17 D; 280/439, 440, 694, 699, 718, 719; 29/172, 173

[56] References Cited

UNITED STATES PATENTS

| 1,781,631 | 11/1930 | Pageol | 267/48 |
|---|---|---|---|
| 1,987,189 | 1/1935 | Geyer | 267/53 |
| 2,047,802 | 7/1936 | Schilde | 267/47 |
| 2,192,646 | 3/1940 | Lindeman | 267/53 |
| 2,670,950 | 3/1954 | Keysor | 267/53 |
| 2,986,388 | 5/1961 | Page | 267/53 |

*Primary Examiner*—James B. Marbert
*Attorney, Agent, or Firm*—Spencer & Kaye

[57] ABSTRACT

A leaf spring formed of a stack of spring leaves which are connected only at the spring ends and the spring middle, is provided at each spring end with a device which presses together several spring leaves with a preset, constant and load-independent force normal to the large faces of the spring leaves.

19 Claims, 12 Drawing Figures

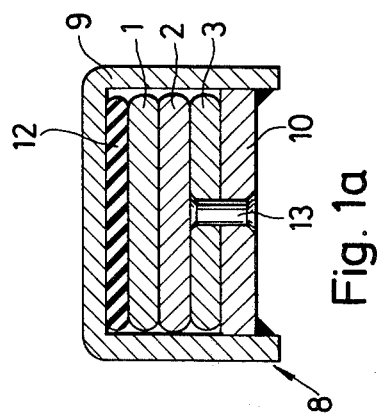
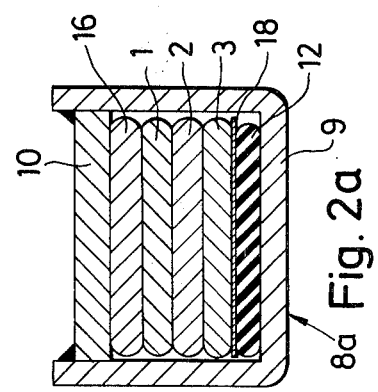
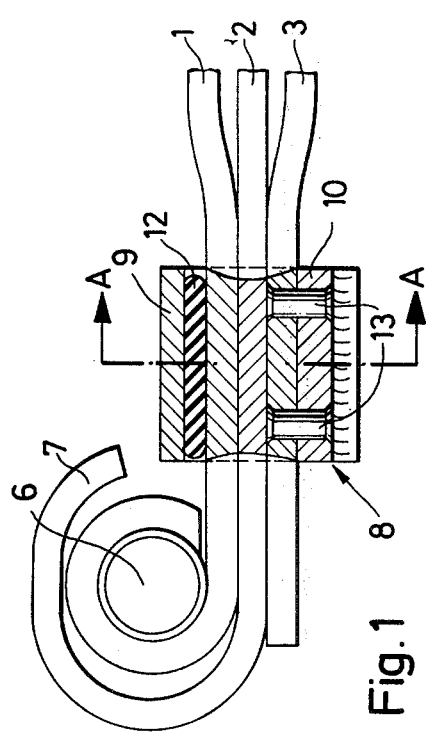
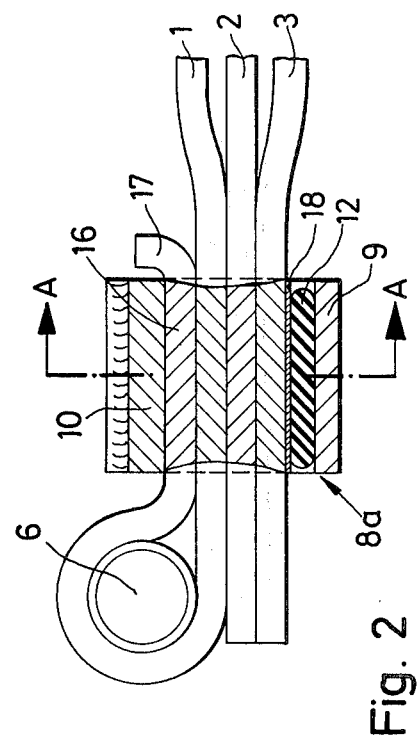

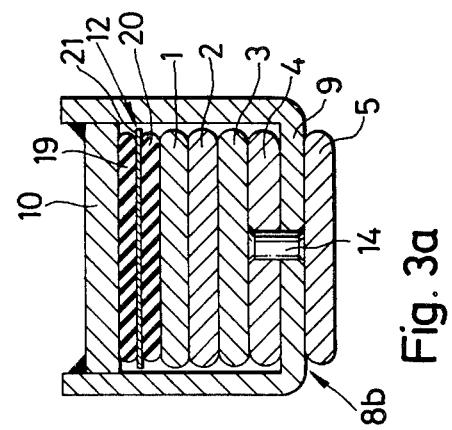
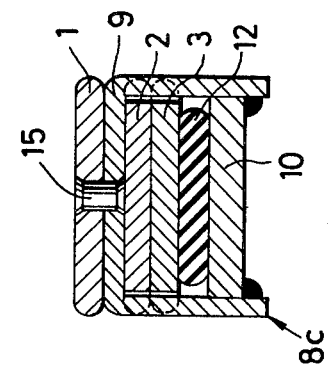
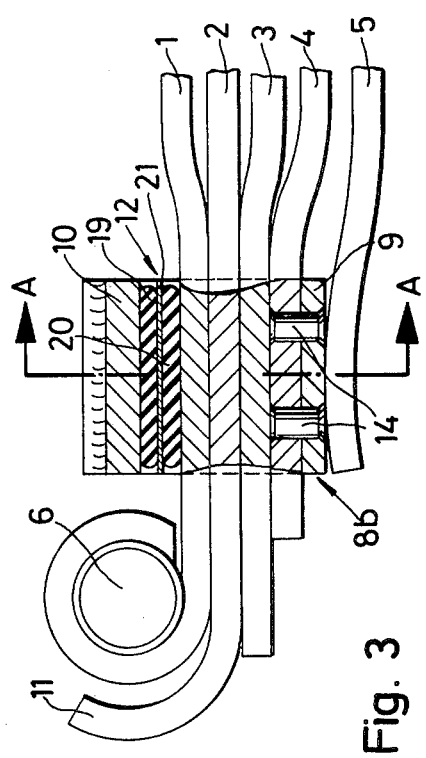
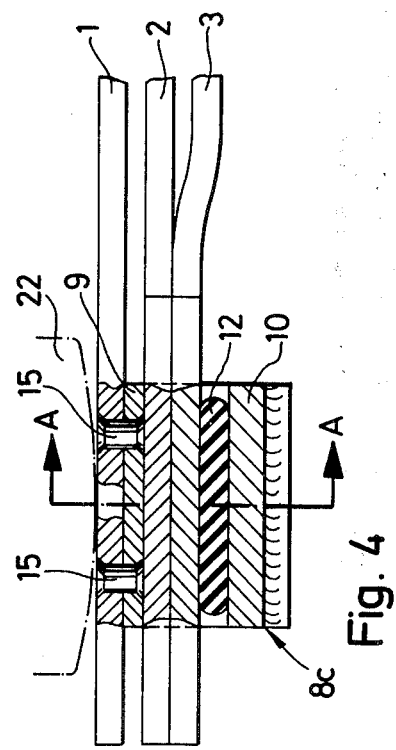

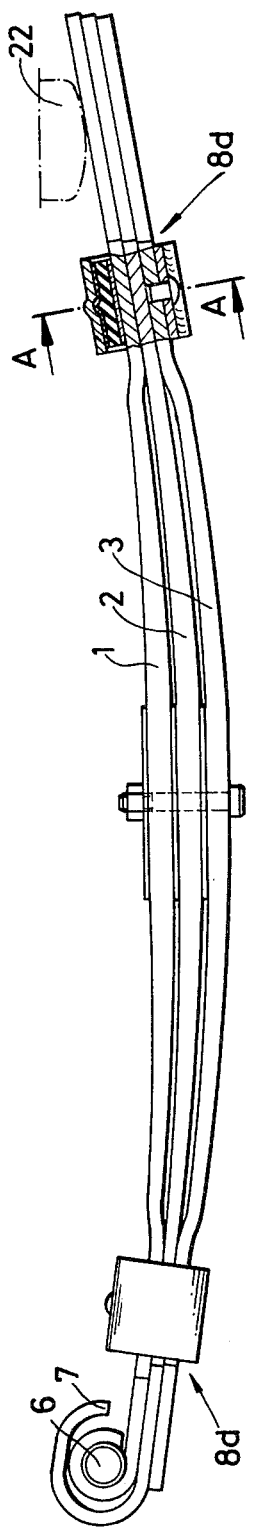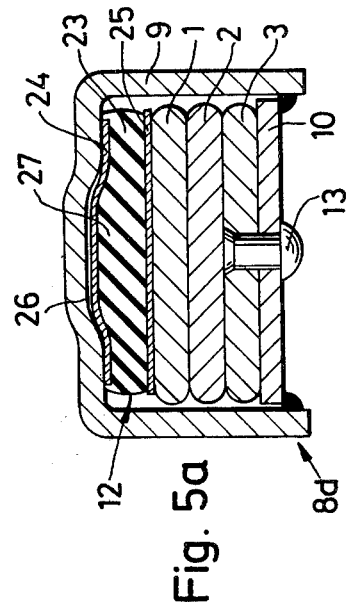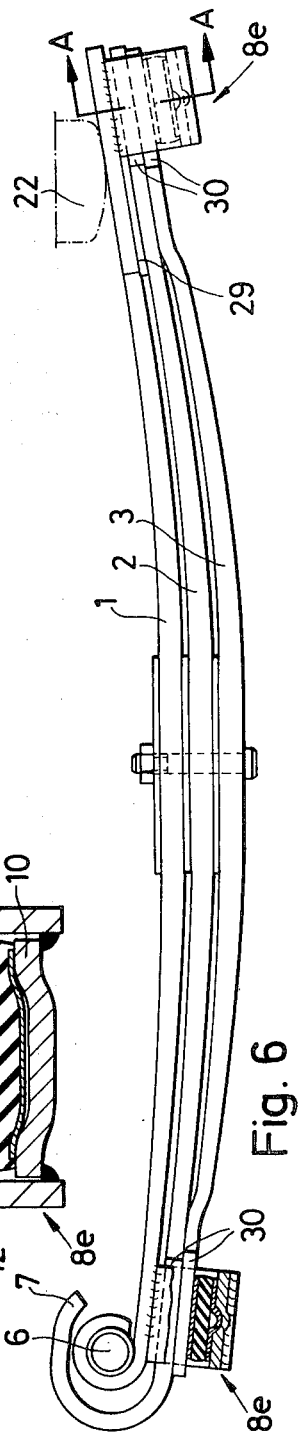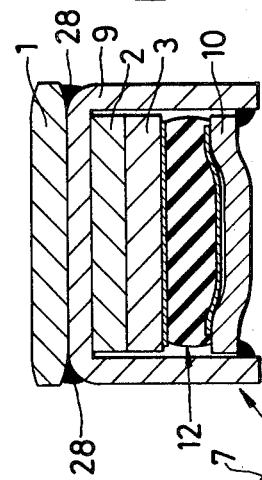

LEAF SPRING

BACKGROUND OF THE INVENTION

The present invention relates to a leaf spring having a plurality of stacked spring leaves which contact one another, through intermediate plates or directly, only in a center clamping region and at their ends. The contact surfaces at the ends act as pairs of friction surfaces during the spring action.

Such a leaf spring is known from German Pat. No. 2,021,608. In the parabolic spring described therein friction plates which are disposed at the ends of the spring between each two spring leaves, form additional pairs of friction surfaces. This known arrangement has the drawback that the natural friction effected in this manner is not sufficient in all fields of application to dampen vibrations in vehicles with leaf spring suspensions. Thus, in case of railroad cars equipped with such parabolic springs, the danger exists that the wheels will jump off the tracks due to excessively high and insufficiently dampened vibration amplitudes of the car body. A further drawback of the known arrangement is that all friction forces depend on the operational load on the spring, since the frictional forces of the leaf spring surfaces which slide on one another are proportional to the forces with which the leaf spring surfaces are pressed against one another. Thus the springs may exhibit an altogether different behavior dependent on whether the car is in a loaded or in an empty state.

SUMMARY OF THE INVENTION

It is an object of the present invention to provide an improved leaf spring in which the internal friction of the leaf spring over its entire operating range is increased and in which, in addition to the variable friction forces generated at the spring leaves as a result of the external spring loads, a constant friction force is produced, the magnitude of which can be selected at will.

This and other objects to become apparent as the specification progresses, are accomplished by the invention, according to which, briefly stated, the spring leaves are pressed against one another at their ends with a selectable, predetermined, constant normal force which is independent of the load and which is applied in addition to the variable normal force which depends on the load of the spring during operation.

In order to permit precise setting of the normal force at the friction surfaces and to prevent that the compressive forces disappear again as a result of even a slight amount of wear on the frictional surfaces of the leaf spring, it is advantageous to provide at each spring leaf end an enclosing clamping device. The latter is a connecting element which includes a generally U-shaped clamp, a transverse bar bridging the legs of the clamp at a distance from the clamp bottom and a compression spring disposed within the clamp. The connecting element is so designed that a relative shifting of the spring leaves with respect to one another in the longitudinal direction of the spring is not form-lockingly impeded. In this manner all pairs of internal friction surfaces are charged with the same load-independent normal force which generates an additional friction force when the spring leaves are longitudinally shifted during operation without thus weakening the spring — particularly the spring eye — by a bore.

In order to maintain the additional normal force in the friction surfaces at the ends of the spring independent of the relative position of the longitudinally displaceable spring leaves and to simultaneously prevent any wear of the compression spring during the longitudinal shifting of the spring leaves with respect to one another, advantageously, the compression spring is made of a rubber elastic material and is arranged as an intermediate pad between one of the outer spring leaves and the clamping device to absorb, by virtue of an elastic shearing deformation, the longitudinal shifts of the uppermost spring leaf with respect to the lowermost spring leaf during operation.

Advantageously the compression spring is vulcanized to the bottom of the clamp and rests on the main spring leaf without being bonded or otherwise affixed thereto. It may also be vulcanized to the clamping device and to a thin sheet metal plate which rests on one of the outer spring leaves without being affixed thereto. In this case the sheet metal plate prevents the rubber elastic material of the compression spring from being pressed out of the sides of the clamping device when the compressive stresses are high. In order to increase the compressive strength, the compression spring may advantageously comprise two identical rubber elastic parts which are vulcanized to the two sides of an intermediate plate and form a structural unit therewith.

It is advantageous to connect the clamping device by means of rivets to one of the outer spring leaves in a form-and-force-locking manner or to fix them in position in a form-locking manner to one end of the main spring leaf which is bent over and serves to secure the spring eye against widening and breaking.

For springs having at least one sliding end, it is advantageous to rivet the back side of the clamp to the main spring leaf form-lockingly and force-lockingly in such a manner that only the remaining spring leaves together with the compression spring are enclosed by the clamping device. As a result, the spring can be supported against the spring bracket over the required length directly through the main spring leaf. The remaining spring leaves which are enclosed by the clamping device are advantageously made narrower in the area of the clamping device by at least twice the wall thickness of the legs of the U-shaped clamp than in the remaining spring zone. In this manner an undesirable widening of the leaf spring at the sliding end is avoided.

To make a leaf spring of the above-outlined structure, the spring leaves are advantageously exposed, after presetting, to a load producing about one-half the maximum spring path and are pressed to the rubber elastic compression spring with the tension desired in the clamping device, while the clamp and the bar of the clamping device are welded together. The clamp or the bar may already have been riveted to one of the spring leaves. Two hydraulic punches may be used whose compressive force can be set by pressure relief valves. In this manner it is ensured that the rubber elastic spring produces exactly the pressure force required to increase friction and simultaneously experiences the smallest possible tangential stress due to longitudinal shifting of the uppermost spring leaf with respect to the lowermost spring leaf during operation.

It is advantageous if the compressive spring is made of a rubber elastic pad, to the upper side and underside of which thin sheet metal plates are vulcanized and which is disposed between the clamp and an outer spring leaf or between the bar and an outer spring leaf and can be inserted into or removed from this location.

Advantageously, the clamp bottom has a recessed portion and the rubber elastic plate has a thickened portion which projects into the recess. The thickened portion of the compression spring may also extend into a recess provided in the transverse bar of the clamp.

In order to be able to produce increased friction even in particularly short parabolic springs used in multiple axle assemblies for motor vehicle trailers, it is advantageous to fasten the clamp to the main spring leaf with the aid of a weld connection, wherein the pressure side of the main spring leaf lies against the outer surface of the clamp.

It is advantageous to provide that portion of the clamp which contacts the sliding end of the pressure side of the main spring leaf with an extension which is oriented in the direction of the spring center and which has a width substantially identical to that of the main spring leaf. This produces long supporting and friction surfaces so that friction and damping of the parabolic spring are increased.

It is also advantageous for the outer width dimension of the clamp to correspond at most to the width of the spring leaves and to laterally taper the lower spring leaves in the region of the clamp.

BRIEF DESCRIPTION OF THE DRAWINGS

FIGS. 1 to 4 are fragmentary side elevational views of leaf springs incorporating different embodiments shown in section taken along the length dimension of the leaf springs.

FIGS. 1a to 4a are respective sectional views of the different embodiments, taken along line A—A of FIGS. 1, 2, 3 and 4.

FIGS. 5 and 6 are side elevational views of the entire leaf springs incorporating different embodiments shown in section taken along the length dimension of the leaf springs.

FIGS. 5a and 6a are respective sectional views of the different embodiments, taken along line A—A of FIGS. 5 and 6.

DESCRIPTION OF THE PREFERRED EMBODIMENTS

In each embodiment illustrated in the different figures, the leaf spring includes a main spring leaf 1 and two or more additional spring leaves 2, 3, 4 or 5.

In the embodiment according to FIGS. 1 and 1a, the main spring leaf 1 ends in a spring eye 6 which is enclosed by a turn 7 of the spring leaf 2. The illustrated end of the leaf spring includes a clamping device 8 comprising a U-shaped clamp 9 and a bar 10 which transversely bridges the clamp legs at a distance from the clamp bottom. A compression spring 12 of a rubber elastic material and pad-like configuration is vulcanized to the bottom of the clamp 9 and rests on the main spring leaf 1 without being bonded or otherwise affixed thereto. The bar 10 is fastened to the spring leaf 3 by means of rivets 13. The clamp 9 and the bar 10 are welded together after the bar has been pressed into the clamp with a certain tension and has been held in its position. The compression spring 12 has thus been compressed by a spring path of 2—3 mm. After welding, the bar 10 can no longer shift within clamp 9 so that the tension in the clamping device remains unchanged.

FIGS. 2 and 2a show a modified embodiment of the friction increasing clamping device 8a. In order to secure against widening and breaking of the spring eye 6 of the main spring leaf 1, its free end 16 is bent toward the center of the spring and is provided with a bent portion 17 which, together with the spring eye 6, holds the clamping device 8a in its position. The compression spring 12 is connected by vulcanization with the bottom of clamp 9 and with a thin sheet metal plate 18 which rests below spring leaf 3 without being affixed thereto. The sheet metal plate 18 prevents the rubber elastic material of the compression spring 12 from being squeezed out of the clamping device 8a in case large tensioning forces are generated in the longitudinal direction of the spring.

FIGS. 3 and 3a show an embodiment of the clamping device at the end of a four-leaf main spring having a spring eye 6 and a spring leaf 2 provided with a partial turn 11 around the spring eye 6. The compression spring 19, 20 is vulcanized to the bar 10 and rests on the main spring leaf 1 without being affixed thereto. The identical parts 19 and 20 of the compression spring are vulcanized to the one and the other face of an intermediate metal sheet or plate 21 in order to stabilize the rubber elastic material. Due to the greater relative movement between the uppermost spring leaf and the lowermost spring leaf in a four-leaf spring, the compression spring 19, 20 should preferably be made thicker than for a three-leaf spring. This would lead to greater stresses by the compression force if no intermediate metal sheet is provided. The clamp 9 of the clamping device 8b is firmly connected with the spring leaf 4 by rivets 14. The clamp 9 additionally serves as a supporting surface for a subsequently engaging spring leaf 5 which acts as an additional spring.

Turning now to FIGS. 4 and 4a, the clamping device 8c is shown at the sliding end of a three-leaf spring. The compression spring 12 is vulcanized to the bar 10 and is disposed below the spring leaf 3 without being affixed (bonded) thereto. The clamp 9 is fastened to the main spring leaf 1 by means of rivets 15 so that the clamp encloses only the spring leaves 2 and 3. In order to prevent widening of the leaf spring in the zone of the clamping device 8c at the sliding end, spring leaves 2 and 3 are made narrower there. This can be done without fear of breakage, because the spring leaves, in any event, are thicker at this point than is theoretically required and the clamping device 8c can be very narrow in the longitudinal direction of the spring.

In the embodiment according to FIGS. 5 and 5a the left end of the spring is hinged with the aid of spring eye 6. The spring is supported at its right end (the sliding end) by a spring bracket 22. The clamping devices 8d are disposed at the ends of the spring; they each comprise a clamp 9 and a bar 10. The compression spring, constituted by a rubber elastic pad 23, is placed between the main spring leaf 1 and the bottom of the clamp 9. To the upper and lower face of the pad 23 there are vulcanized thin sheet metal plates 24 and 25, respectively. Upon assembly of the clamping device 8d, the compression spring 23 is loosely placed onto the uppermost spring leaf 1. Thereafter the clamp 9 is placed onto the compression spring 23 and the bar 10 is pressed into the clamp 9 and welded thereto. In the reverse order, the compression spring 23 can be released and removed so that it can be replaced or used elsewhere.

In order to ensure that the compression spring 23 is immobilized in its postion in the clamp 9, it is provided with a raised portion 27 which projects into a conformingly shaped recess or depression 26 in the clamp 9.

In FIGS. 6 and 6a the clamps 9 are disposed below the main spring leaf 1 directly in the zone of the terminal supports. This arrangement makes possible to provide even extremely short springs with increased friction. This embodiment is suitable in particular for short parabolic springs usually finding application in multi-axle assemblies for motor vehicle trailers. In order to fasten the back side of the clamps 9 to the main spring leaf 1, weld connections 28 are provided which are applied before the main spring leaf 1 is tempered. This embodiment has the advantage that no holes for rivets need be made in the main spring leaf 1. The clamping devices 8e are disposed extremely far out, close to the spring ends, so that they do not extend into the zone which is subjected to the highest loads and which constitutes the main spring action zone. The pressure side of the main spring leaf 1 is substantially insensitive to the notching effects of the welds so that the spring will not be weakened.

The outer width of the clamp 9 corresponds to the width of the main spring leaf 1. Thus, the two lower spring leaves 2 and 3 have to be provided with tapered portions 30 on their sides in the zone of clamp 9 to be enclosed thereby. No danger of breakage exists at the tapers 30 because the reduction in width extends only over a short zone near the points where the forces are introduced and where the spring leaves 2 and 3 inevitably have greater thickness dimensions.

That part of clamp 9 which contacts the pressure side of the main spring leaf 1 has an extension 29 which is oriented towards the center of the spring and which has a width corresponding to the main spring leaf 1. The extension 29 serves to enlarge the supporting and friction surfaces and further improves the damping of the spring.

It will be understood that the above description of the present invention is susceptible to various modifications, changes and adaptations, and the same are intended to be comprehended within the meaning and range of equivalents of the appended claims.

I claim:

1. In a parabolic leaf spring including a plurality of stacked spring leaves connected to one another at least indirectly at the spring ends to form pairs of contacting friction surfaces between which load-dependent normal friction forces are generated during spring action, the improvement comprising:
   a. a rigid clamping yoke of closed cross section provided at the ends of the parabolic leaf spring and surrounding at least two of the stacked spring leaves; said rigid clamping yoke including
      1. a generally U-shaped clamp having spaced legs and a bottom;
      2. a transverse bar rigidly affixed to said clamp and bridging said legs at a distance from said bottom;
   b. a rubber-elastic pad disposed within said clamping yoke and having opposite first and second faces, at least said first face being oriented towards and adjacent to one of said spring leaves; said clamping yoke compressing said rubber-elastic pad for pressing at least two of said spring leaves to one another at the ends of the parabolic leaf spring with an accurately predetermined, load-independent, normal force; said load-independent force being applied in addition to said load-dependent force; and
   c. first and second metal surfaces being bonded face-to-face to said first and second faces, respectively, of said pad, said first metal surface constituting a first face of a metal plate member; said metal plate member having a second, opposite face being in a face-to-face frictional engagement with said one of said spring leaves.

2. A leaf spring as defined in claim 1, wherein said pad is disposed between the clamp bottom and an outer spring leaf of said leaf spring and wherein said second metal surface is constituted by said clamp bottom.

3. A leaf spring as defined in claim 1, including rivet means for affixing said clamping yoke to an outer spring leaf of said leaf spring.

4. A leaf spring as defined in claim 1, wherein an outer spring leaf includes, at one end of the leaf spring, a bent portion defining a spring eye, said bent portion having a terminal part extending into said clamping yoke and being pressed by said pad.

5. A leaf spring as defined in claim 1, wherein one of said spring leaves is a main spring leaf and the remainder of said spring leaves are additional spring leaves and at least one of said leaf spring ends is constituted by a sliding end, said main leaf spring being affixed to said clamping yoke and extending externally thereof; said clamp and said bar surrounding said additional spring leaves.

6. A leaf spring as defined in claim 1, said clamp having an external width that is at the most equal to the width of said spring leaves.

7. A leaf spring as defined in claim 6, wherein the spring leaves surrounded by said clamp have, along the zone of said clamp, laterally tapered portions.

8. A leaf spring as defined in claim 1, wherein each spring leaf has opposite large faces and opposite narrow edge faces; the spring leaves being in a face-to-face relationship with their large faces; and wherein said rubber-elastic pad extending solely across the area of said large faces within said clamping yoke; said pad being compressed in the direction of its thickness uniformly by said clamping yoke for exerting uniformly said load-independent force over the entire area of the large faces of said spring leaves.

9. In a leaf spring including a plurality of stacked spring leaves connected to one another at least indirectly at the spring ends to form pairs of contacting friction surfaces between which load-dependent normal friction forces are generated during spring action, the improvement compromising:
   a. a rigid clamping yoke of closed cross section provided at the ends of the leaf spring and surrounding at least two of the stacked spring leaves; said rigid clamping yoke including
      1. a generally U-shaped clamp having spaced legs and a bottom;
      2. a transverse bar rigidly affixed to said clamp and bridging said legs at a distance from said bottom; and
   b. a compression spring disposed within said clamping yoke and comprising, in a unitary structure, two identical, rubber-elastic pads and an intermediate sheet metal plate inserted between said pads in a face-to-face relationship therewith; said plate being bonded to both said pads; said clamping yoke biasing said compression spring for pressing at least two of said spring leaves to one another at the ends of the leaf spring with an accurately predetermined, load-independent, normal force; said load-independent force being applied in addition to said load-dependent force.

10. In a leaf spring including a plurality of stacked spring leaves connected to one another at least indirectly at the spring ends to form pairs of contacting friction surfaces between which load-dependent normal friction forces are generated during spring action, the improvement comprising:
 a. a rigid clamping yoke of closed cross section provided at the ends of the leaf spring and surrounding at least two of the stacked spring leaves; said rigid clamping yoke including
  1. a generally U-shaped clamp having spaced legs and a bottom; each spring leaf, in the zone that is surrounded by said clamping yoke, is narrower than in the remaining spring zone by at least twice the thickness of the clamp legs;
  2. a transverse bar rigidly affixed to said clamp and bridging said legs at a distance from said bottom; and
 b. a compression spring disposed within said clamping yoke; said clamping yoke biasing said compression spring for pressing at least two of said spring leaves to one another at the ends of the leaf spring with an accurately predetermined, load-independent, normal force; said load-independent force being applied in addition to said load-dependent force.

11. In a leaf spring including a plurality of stacked spring leaves connected to one another at least indirectly at the spring ends to form pairs of contacting friction surfaces between which load-dependent normal friction forces are generated during spring action; each spring leaf having opposite large faces and opposite narrow edge faces; the spring leaves being in a face-to-face relationship with their large faces; the improvement comprising:
 a. a rigid clamping yoke of closed cross section provided at the ends of the leaf spring and surrounding at least two of the stacked spring leaves; said rigid clamping yoke including
  1. a generally U-shaped clamp having spaced legs and a bottom;
  2. a transverse bar rigidly affixed to said clamp and bridging said legs at a distance from said bottom;
 b. a rubber-elastic pad disposed within said clamping yoke and having opposite first and second faces and extending, within said clamp, solely over the area of the large spring leaf faces; said clamping yoke compressing said rubber-elastic pad for pressing at least two of said spring leaves to one another at the ends of the leaf spring with an accurately predetermined, load-independent, normal force; said load-independent force being applied in addition to said load-dependent force; and
 c. first and second sheet metal plates each having opposite first and second faces and being disposed in said clamp; said first face of said first plate being bonded to said first face of said pad; said first face of said second plate being bonded to said second face of said pad, said second face of said second plate engaging unbonded an outer spring leaf of said leaf spring, whereby said pad and said plates are removable as a unit from said clamp upon opening thereof.

12. A leaf spring as defined in claim 11, wherein said second face of said first plate engages unbonded said bottom of said clamp.

13. A leaf spring as defined in claim 11, wherein said second face of said first plate engages unbounded said bar.

14. In a leaf spring including a plurality of stacked spring leaves connected to one another at least indirectly at the spring ends to form pairs of contacting friction surfaces between which load-dependent normal friction forces are generated during spring action, the improvement comprising:
 a. a rigid clamping yoke of closed cross section provided at the ends of the leaf spring and surrounding at least two of the stacked spring leaves; said rigid clamping yoke including
  1. a generally U-shaped clamp having spaced legs and a bottom;
  2. a transverse bar rigidly affixed to said clamp and bridging said legs at a distance from said bottom; and
 b. a rubber-elastic pad disposed within said clamping yoke and having a face provided with a thickened, raised portion; said clamping yoke compressing said rubber-elastic pad for pressing at least two of said spring leaves to one another at the ends of the leaf spring with an accurately predetermined, load-independent, normal force; said load-independent force being applied in addition to said load-dependent force.

15. A leaf spring as defined in claim 14, further comprising means defining a depression in said bottom of said clamp, said raised portion projecting into said depression.

16. A leaf spring as defined in claim 14, further comprising means defining a depression in said bar, said raised portion projecting into said depression.

17. In a leaf spring including a plurality of stacked spring leaves connected to one another at least indirectly at the spring ends to form pairs of contacting friction surfaces between which load-dependent normal friction forces are generated during spring action; one of the spring leaves being a main spring leaf; the improvement comprising:
 a. a rigid clamping yoke of closed cross section provided at the ends of the leaf spring and surrounding at least two of the stacked spring leaves; said rigid clamping yoke including
  1. a generally U-shaped clamp having spaced legs and a bottom;
  2. a transverse bar rigidly affixed to said clamp and bridging said legs at a distance from said bottom; and
 b. a compression spring disposed within said clamping yoke and having opposite first and second faces, at least said first face being oriented towards and adjacent to one of said spring leaves; said clamping yoke compressing said compression spring for pressing at least two of said spring leaves to one another at the ends of the parabolic leaf spring with an accurately predetermined, load-independent, normal force; said load-independent force being applied in addition to said load-dependent force; said main spring leaf being affixed to said clamping yoke and extending externally thereof, said main spring leaf having one face oriented towards the pressure side of the spring, said one face of said main spring leaf engaging face-to-face an outer surface of said clamp.

18. A leaf spring as defined in claim 17, said leaf spring having a sliding end; said outer surface of said clamp which is situated adjacent said sliding end has an extension oriented towards the middle of said leaf spring, said extension has a width being substantially equal to that of said main spring leaf.

19. In a method of making a leaf spring including a plurality of stacked spring leaves connected to one another at least indirectly at the spring ends to form pairs of contacting friction surfaces, the improvement comprising the steps of
 a. loading said leaf spring with a force for causing a spring deflection of approximately one half of the maximum spring path;
 b. surrounding at least two of said spring leaves at each spring end with a generally U-shaped clamp;
 c. inserting in the clamp a rubber elastic pad;
 d. placing into the open end of the clamp a transverse bar;
 e. applying an external force of predetermined magnitude to the bar for pressing the bar into the clamp and thus causing compression of said pad to a desired extent; and
 f. welding said bar to said clamp during the application of said external force and after said pad has been compressed to the desired extent, whereby said pad permanently exerts a compressing force to the spring leaves surrounded by the clamp and the bar welded thereto.

* * * * *